(12) United States Patent
Ditlow et al.

(10) Patent No.: US 7,136,798 B2
(45) Date of Patent: Nov. 14, 2006

(54) METHOD AND APPARATUS TO MANAGE MULTI-COMPUTER DEMAND

(75) Inventors: Gary Ditlow, Garrison, NY (US); Daria Rose Dooling, Huntington, VT (US); David Erin Moran, South Burlington, VT (US); Stephen D. Thomas, Essex Junction, VT (US); Ralph James Williams, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 10/064,486

(22) Filed: Jul. 19, 2002

(65) Prior Publication Data
US 2004/0015334 A1    Jan. 22, 2004

(51) Int. Cl.
*G06F 9/455* (2006.01)
*H04L 12/28* (2006.01)

(52) U.S. Cl. .................. 703/14; 709/201; 709/231

(58) Field of Classification Search .............. 703/2, 703/14; 709/104, 231, 226, 201; 713/300; 707/101, 104; 714/3; 716/2
See application file for complete search history.

(56) References Cited

U.S. PATENT DOCUMENTS

| | | | |
|---|---|---|---|
| 5,146,589 A * | 9/1992 | Peet et al. ................. 714/3 |
| 5,708,832 A | 1/1998 | Inniss et al. ............ 709/229 |
| 5,754,829 A | 5/1998 | Motohiro et al. ........ 709/201 |
| 5,845,627 A | 12/1998 | Olin et al. ............... 123/621 |
| 5,928,328 A | 7/1999 | Komori et al. .......... 709/223 |
| 5,930,773 A | 7/1999 | Crooks et al. ............ 705/30 |
| 6,003,029 A * | 12/1999 | Agrawal et al. ............ 707/7 |
| 6,230,200 B1 * | 5/2001 | Forecast et al. ......... 709/226 |
| 6,633,882 B1 * | 10/2003 | Fayyad et al. ........... 707/101 |
| 2002/0004913 A1 * | 1/2002 | Fung ....................... 713/300 |
| 2002/0143979 A1 * | 10/2002 | Douceur et al. ......... 709/231 |
| 2003/0078955 A1 * | 4/2003 | Ditlow et al. ............ 709/104 |

OTHER PUBLICATIONS

Dooling et al., "Parallel Domain Decomposition for Integrated Circuit Designs." Presented at the First SIRM Conference on Computational Science and Engineering, Sep. 21, 2000, Washington, D.C.

\* cited by examiner

*Primary Examiner*—Thai Phan
(74) *Attorney, Agent, or Firm*—Ryan K. Simons; Richard M. Kotulak (57) ABSTRACT

A method, multi-computer media and apparatus that uses an economics model to manage the demand and the resource satisfying that demand for multi-computer memory. The present invention quantifies demand as a function of space, and computer resource as a function of time, so that a computational system can meet an application demand.

24 Claims, 12 Drawing Sheets

SCALAR FIELD

VECTOR FIELD

METHOD AND APPARATUS TO MANAGE MULTI-COMPUTER DEMAND

IN THE CROSS REFERENCE

The present application is related in subject matter to the following commonly-assigned pending applications: BALANCING GRAPHICAL SHAPE DATA FOR PARALLEL APPLICATIONS, Ser. No. 09/631,764 filed Aug. 3, 2000, now U.S. Pat. No. 6,788,302, and METHOD AND APPARATUS TO MANAGE MULTI-COMPUTER SUPPLY, Ser. No. 09/943,829 filed Aug. 31, 2001, publication No. US2003/0078955A1, on Apr. 24, 2003.

BACKGROUND OF THE INVENTION

1. Field of the Invention

The present invention is related to quantifying the multi-computer memory demand of a physical mathematics model, and more specifically to the multi-computer data processing of this model. More particularly present invention refers to managing the demand for computer memory caused by the formulation of large-scale scientific and engineering problems that are solved on multi-computers.

2. Description of the Related Art

A supply schedule shows the amount of a commodity that a producer is willing and able to supply over a period of time at various prices. A graph of the supply schedule is called the supply curve. The supply curve usually slopes upward from left to right because a higher price must be paid to a producer to induce the production of a commodity due to overhead costs. So the price of a commodity is directly proportional to its supply, and is called the law of supply.

A demand schedule shows the amount of a commodity that a consumer is willing and able to demand over a period of time at various prices. A graph of the demand schedule is called the demand curve. The demand curve usually slopes downward from left to right because a lower price induces the consumer to purchase more of a commodity. This is to say that the price of a commodity is inversely proportional to its demand, and is called the law of demand. The equilibrium price and equilibrium quantity of a commodity are determined by its supply and demand. An equilibrium schedule shows the intersection of the supply curve and the demand curve. A graph of the equilibrium schedule is called the equilibrium curve and is called the law of equilibrium.

Multi-computer processing, hereafter called multi-processing, involves the use of multiple computers to process a single computational program that could be numerical, alphabetical, or both. Multi-processing is distinguished from uni-processing where a single computer is used to process an application program, and refers to the use of a parallel or a distributed computer. The programming of multi-computer is referred to as parallel programming.

One method of multi-processing is by the use of the Message Passing Interface (MPI), which is a communication library for multi-computer communication. The defining feature of the message passing model is that the transfer of data from the memory of one or more computers to the local memory of another one or more computers requires operations to be performed by all of the computers involved. Two versions of MPI software for UNIX-like operating systems are: the IBM Parallel Operating Environment, or POE, which is a licensed IBM product, and Argonne National Laboratory's implementation of MPI, or MPICH, which is publicly available.

The advantages and motivations for using multi-computing are, at least, three fold. First, the potentially enormous demand for computer resources made by a computational task is divided among multiple computers; second, the time required to complete a variety of applications is scaled-down by the number of processors used, and third, the reliability of completing such applications is increased because of the shorter processing time. The first of these reasons is the most important, since without sufficient resources, no time-scaling is possible.

BRIEF SUMMARY OF THE INVENTION

This invention teaches a method, media and apparatus to tabulate a description of memory demand, then subsequently, based on the supply of multi-computer hosts, produce a list of one or more computers to satisfy the demand along with data-segments of the model. The properties of physical systems can be quantified by one or more partial differential equations phrased in one of several discretized numerical forms. The present invention addresses the problem of meeting the demand for memory made by the formulation of such a discretized system model, and teaches a method and apparatus to do so.

The invention calculates the density of the data needed to represent a system of interest, where often this data represents one or more electrical, mechanical, thermal, or optical properties. More particularly this invention determines the memory needs of processors in a parallel processing system by inputting a discretized model for an application and initializing a computational domain; calculating a data density for each control element; calculating demand cost for each sub-domain; minimizing the difference in average demand cost; ranking the processors by value; and generating a data ownership table and frame file.

DETAILED DESCRIPTION OF THE INVENTION

A computer system is described by at least four properties; central processing unit (CPU), main memory, temporary file space, and cache memory page space. The property of CPU is dimensionless and therefore unit-less. CPU is simply a count of the number of CPUs. The remaining three properties, main memory, temporary file space, and cache memory page space all have the dimension of data and the units of byte. For example, a computer may have the resources of four CPUs, 256 mega-bytes of main memory, 500 mega-bytes of temporary file space, and 125 mega-bytes of cache memory page space. Furthermore, this system may be comprised of several such computers, thereby being a multi-computer.

An integrated circuit (IC), such as a microprocessor, can be described in a physical sense as a volumous block, with its electrical signals connected to the "top" of the block, transferred "down" and through the block to the transistors that occupy a plane and perform the function of the IC and rest upon a "lower" substrate, and subsequently returned to the top of the block through a similar series of wiring planes. See FIGS. 1 and 2. The metal and via levels on FIG. 2 are represented by the resistive supply grid and the resistive ground grid of FIG. 1. The wiring planes are shared by the three signal types of an IC: power signals (supply voltages and ground voltages), clock signals, and data/control signals. These signals pass from the electrical contacts down to the transistors, then back to the electrical contacts, by means of a series of superimposed and electrically insulated conductors. These planes are a laminate of "grids" and intervening "vias," all with electrical resistance, capacitance and inductance.

The physical structure of an IC can be expressed in a graphics language such as GL/1 that is recorded in a file and can involve massive amounts of data. A method and apparatus for managing this data is described in patent application Balancing Graphical Shape Data For Parallel Applications, Ser. No. 09/631,764 filed Aug. 3, 2000, now U.S. Pat. No. 6,788,302, called Parallel Chip Enable, or PARCE shown as 30 in FIG. 3. In that method the physical structure of an IC is geographically decomposed for subsequent parallel applications. PARCE is a scalable parallel program. A metric, called data density, is computed for the GL/1 data. Data density is instantiated in a matrix that summarizes the bytes required to represent physical structures on the IC. Based on this matrix, the input GL/1 file is decomposed into several smaller files called frames. The decomposition respects the IC hierarchy, the geographic placement of IC cells, or building blacks, as well as the balance in terms of a homogeneous network.

Figure 3:
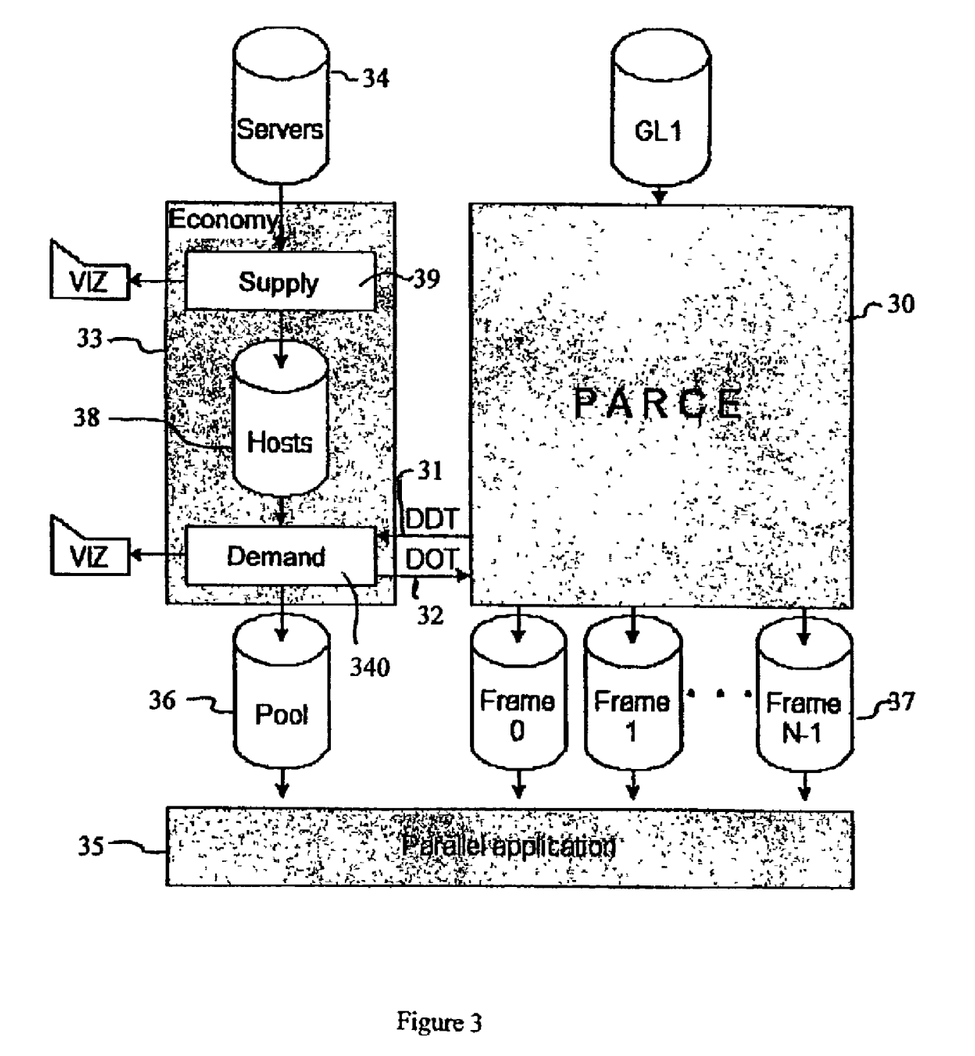
FIG. 3 shows the data flow of an embodiment of this invention.

The apparatus for present invention and that for the above invention are simular in that a data density table (DDT) shown emanating from PARCE as 31 and the data ownership table (DOT) shown emanating from the demand block 340 as 32 are used in this invention. Those functions contained within block 30 are integrated into this invention through block 340.

Figure 1:
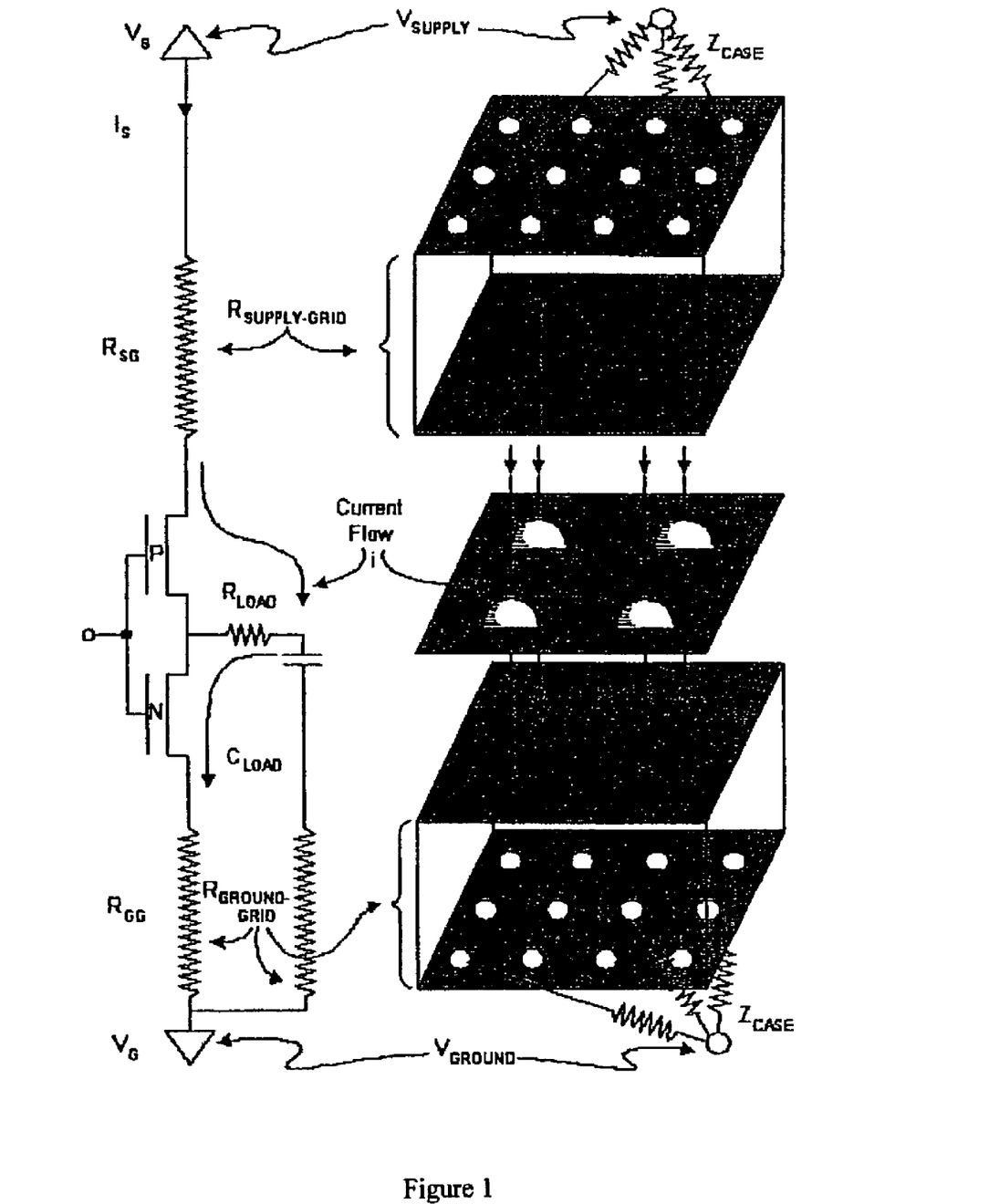
FIG. 1 shows an IC model as an example of a parallel application.
Figure 2:
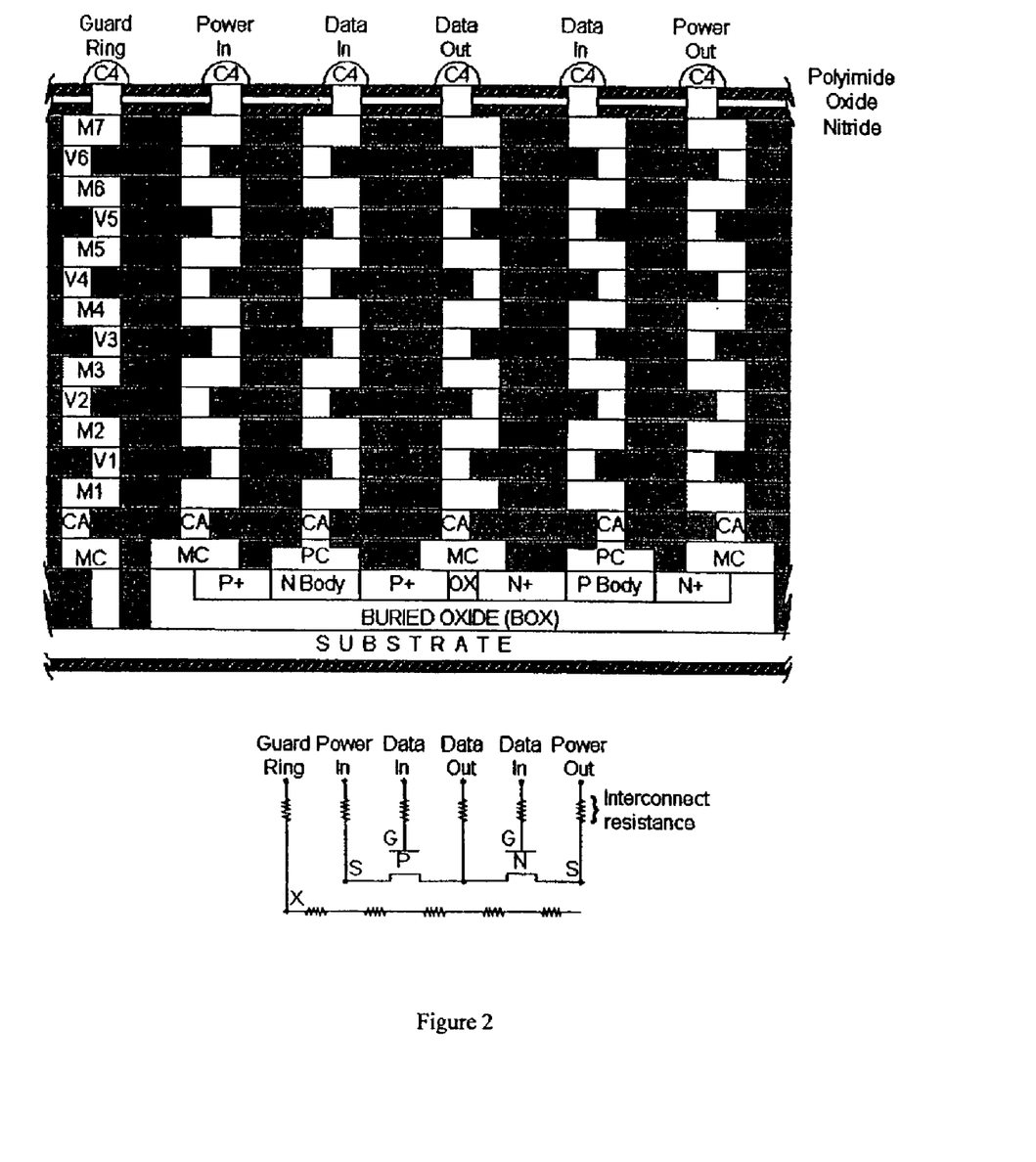
FIG. 2 shows the cross-section of a chip with various metal levels.

An overview of the system environment of invention can be seen in the left side of FIG. 1, wherein is shown the file (named "Servers") 34 of all resources available in the network for executing a parallel application 35. A server is any data processor attached to a computer network. A server can be a printer, a personal computer, a fax machine, a UNIX workstation 33, etc. A host is a UNIX workstation that will accept commands from the network. Module 33 (called "Economy") generates an output file 36 (called "Pool") which lists the resources selected by Economy for executing the parallel application 35.

The output of the present invention are the data density table 31, the pool file 36, frame files 37 and ownership table 32 which are a reflection of computed memory demand for the application.

Having a physical system, an IC for example, quantification can begin when the laws governing the system are expressed in a mathematical form, usually as one or more partial differential equations (PDE). Such PDEs appear in electromagnetics, thermodynamics, fluid dynamics, and heat transfer, to name a few applications. Several techniques can solve partial differential equations including both exact analysis and approximate numerical methods. The type of PDE, the number of its dimensions, the type of coordinate system used, whether the governing equations are linear or nonlinear, and if the problem is steady-state or transient determine the solution technique. The numerical method of discretization is a powerful method for solving PDEs. Discretization is a family of numerical methods whereby the continuous results contained in the exact solution is replaced with discrete values. The computational domain, represented by a grid is defined over the physical domain of the system under analysis.

Figure 4:
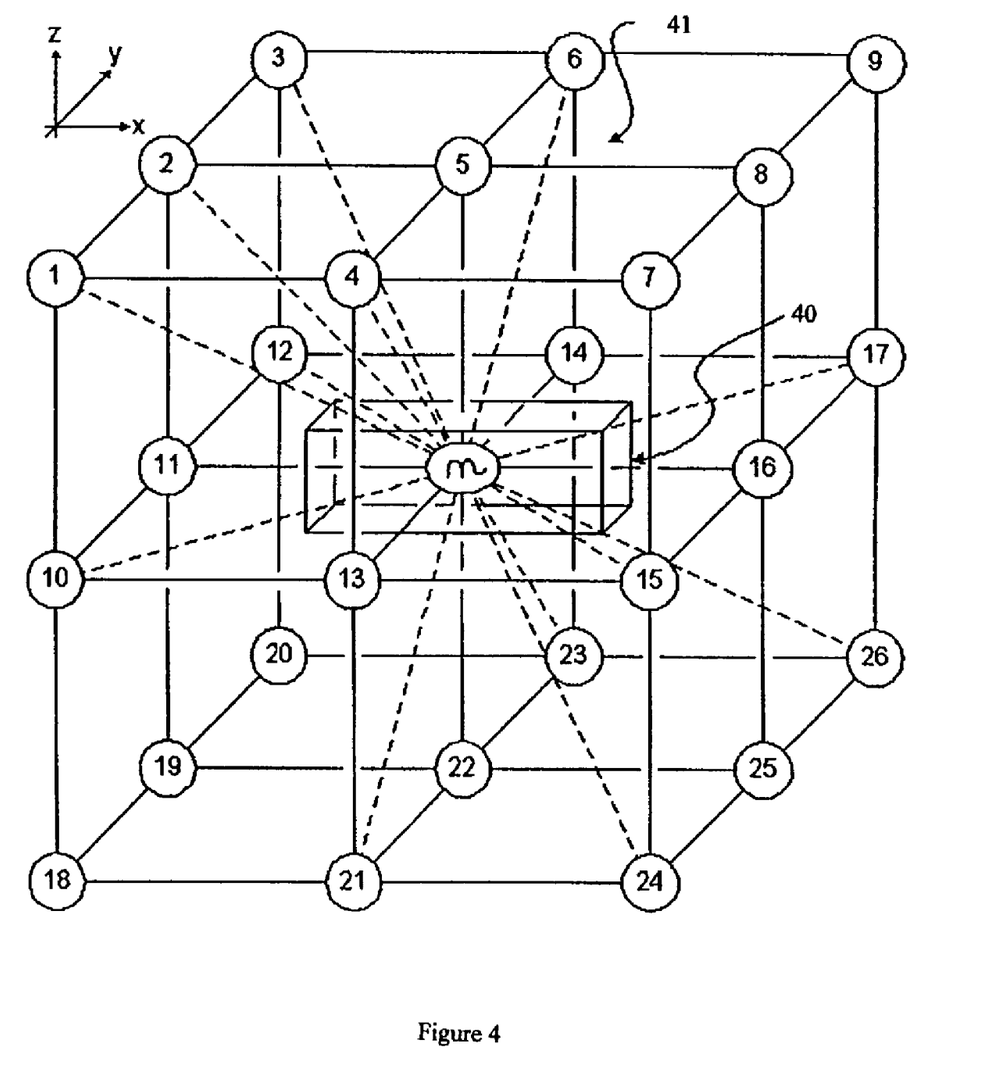
FIG. 4 is a control element, which is the result of discretization of a problem. Data density is computed for each control element.

Usually the physical system under analysis is irregular in shape, which results in an irregular grid in the physical domain. The usual approach is to map the physical domain into a regular computational domain such as squares or rectangles by means of a transformation. This mapping is shown in FIG. 4. This practice lends itself to parallel processing, since the computational domain can be partitioned along these regular lines (herein called these bisectors (See FIG. 10)) and the resulting sub-domains directed to multiple computers.

Thus the calculation domain is divided into a number of non-overlapping control elements such that there is one control element 40 surrounding each grid point n of finite element grid 41. So a discretized linear-space looks like a 1×n or m×1 line of control elements, shown as 50 in FIG. 5A; a discretized area-space looks like an m×n plane of control elements, shown as 51 in FIG. 5B; and a discretized volume-space looks like a m×n×p cube of control elements, shown as 52 in FIG. 5C. Within each control element, or grid point, one or more PDEs are defined, using combinations of the above mentioned dimensions.

The primary goal of the present invention is that it quantifies the amount of computer memory storage needed to express the discretized form of a system. The present invention computes the amount of memory needed to formulate a system to solve the discretized problem. An amount of memory storage is referred to as demand, which is huge for many scientific and engineering problems. Since the discretized grid varies across its problem space, so does its demand. The present invention allows for this demand to be distributed to multiple computers, and so solves the problem of poor computational performance, and its possible failure, when the resource demand exceeds the computational resource supply. An advantage of the present invention is that it quantifies this demand as a function of space to guarantee that this demand does not exceed its supply.

An understanding of the present invention begins with the notion of data. The data associated with a system is related to the change in the media of a system with respect to space and time. Thus a system that demonstrates change has more data than a system of the same space that demonstrate less change.

Next is the notion of a data point in a system. To illustrate a point, consider FIG. 5. The perspective is as if one were "looking down" at the space. Each square or small cube represents a control volume surrounding a node point, or control element. These node points are a result of a numerical discretization.

Figure 5:
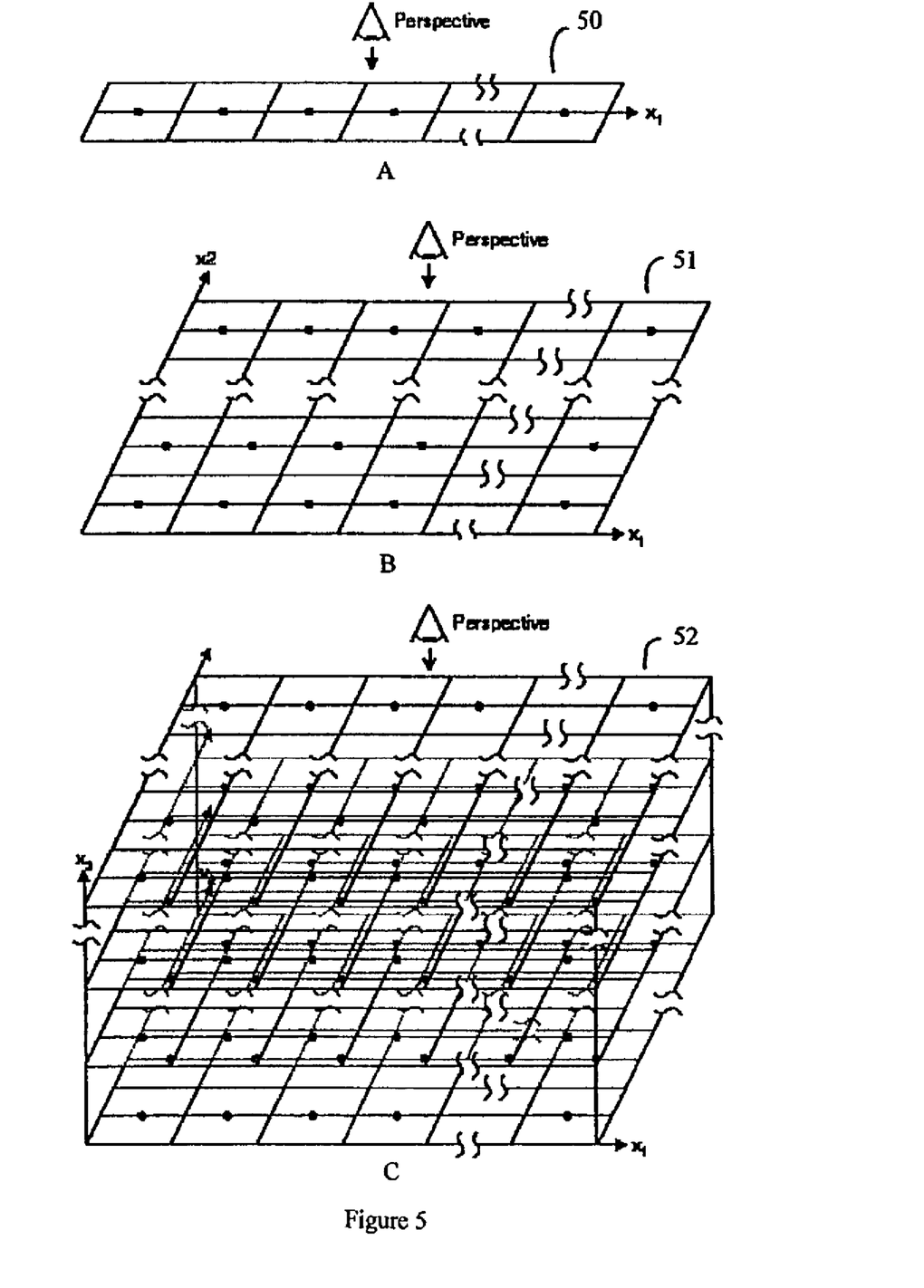
FIG. 5 shows the "perspective" of one-, two-, and three-space data density. Each dot pictured is a control element.

This introduces the concept of bisectors. Bisectors are defined as mathematical boundaries within the control space and are perpendicular to the axis or axes of the space. For example, as illustrated in FIG. 5, the bisectors of the $x_1$ axis cut across the $x_1$ axis. Both horizontal bisectors and vertical bisectors are possible.

Figure 10:
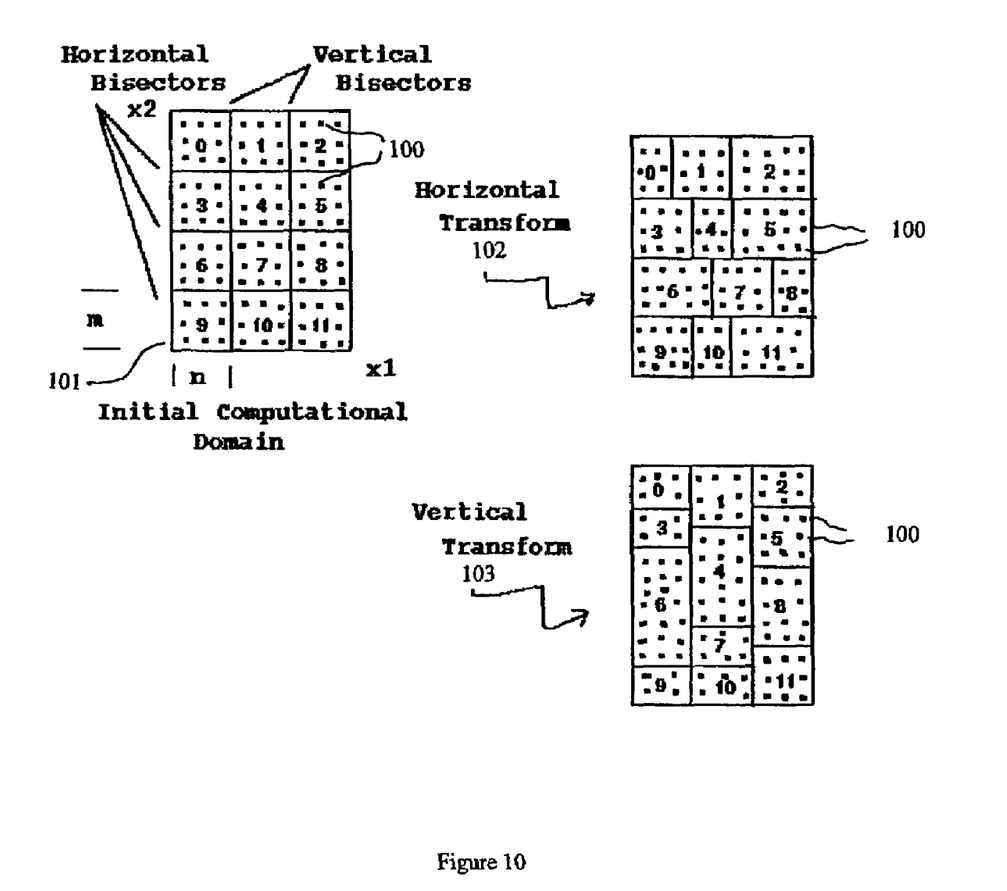
FIG. 10 shows a computational domain before and after optimization of the average Demand Cost over all sub-domains.

Consider a physical space with axis $x_1$ and $x_2$ as shown in FIG. 10. $x_1$ is partitioned every n integer length units, and $x_2$ every m integer length units. This m ×n area is referred to as the initial computational domain, or simply the domain. The m×n grid marks the sub-domains 101. The domain is further partitioned into i rows and j columns. Now the sub-domains are consistently partitioned and are separated by horizontal bisectors and vertical bisectors. Horizontal bisectors run east and west across the domain, while vertical bisectors run north and south, dividing the domain into sub-domains of size i×j. This provides an m×n area—the domain—divided into i×j boxes—the control elements of the sub-domains 101. Note that each sub-domain contains many control volumes; each control volume contains a node point. These are depicted as dots 100 in FIG. 10.

Data density is defined by this invention as data density=data/point×point/space=data/space.

Figure 6:
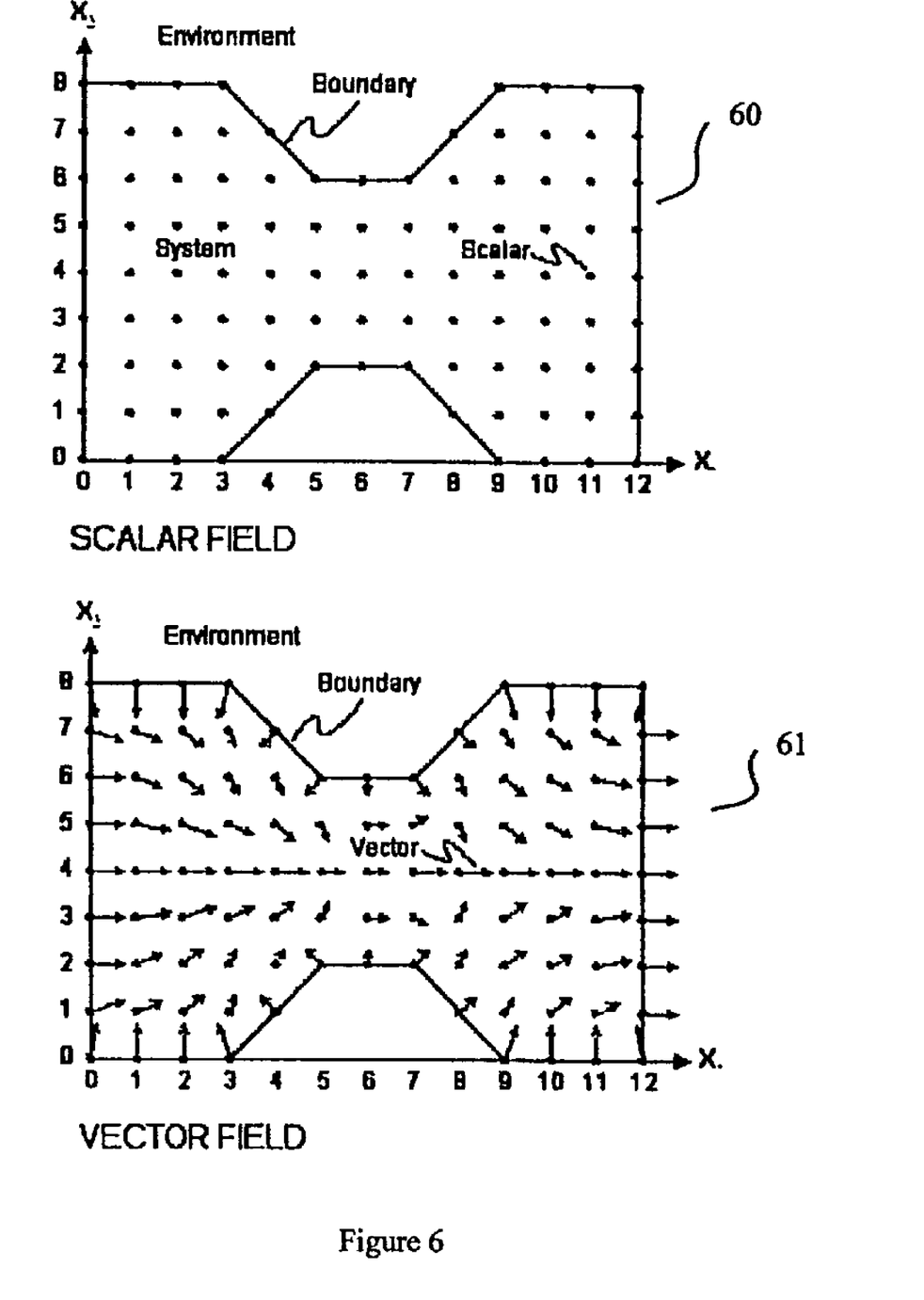
FIG. 6 shows two discretized systems represented by scalar and vector fields.
Figure 7:
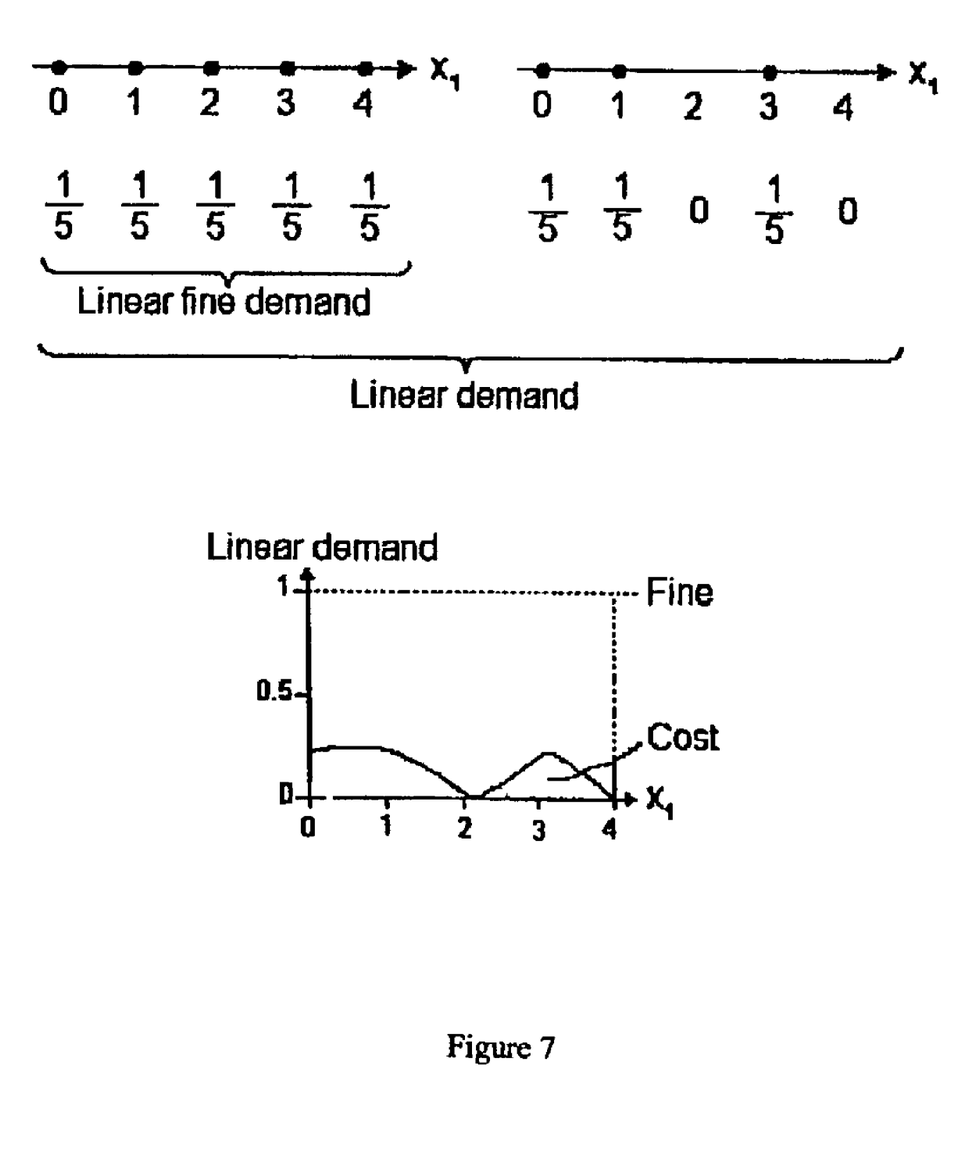
FIG. 7 shows the control elements, the density function and a graph of the Demand Cost for a one dimensional system.
Figure 8:
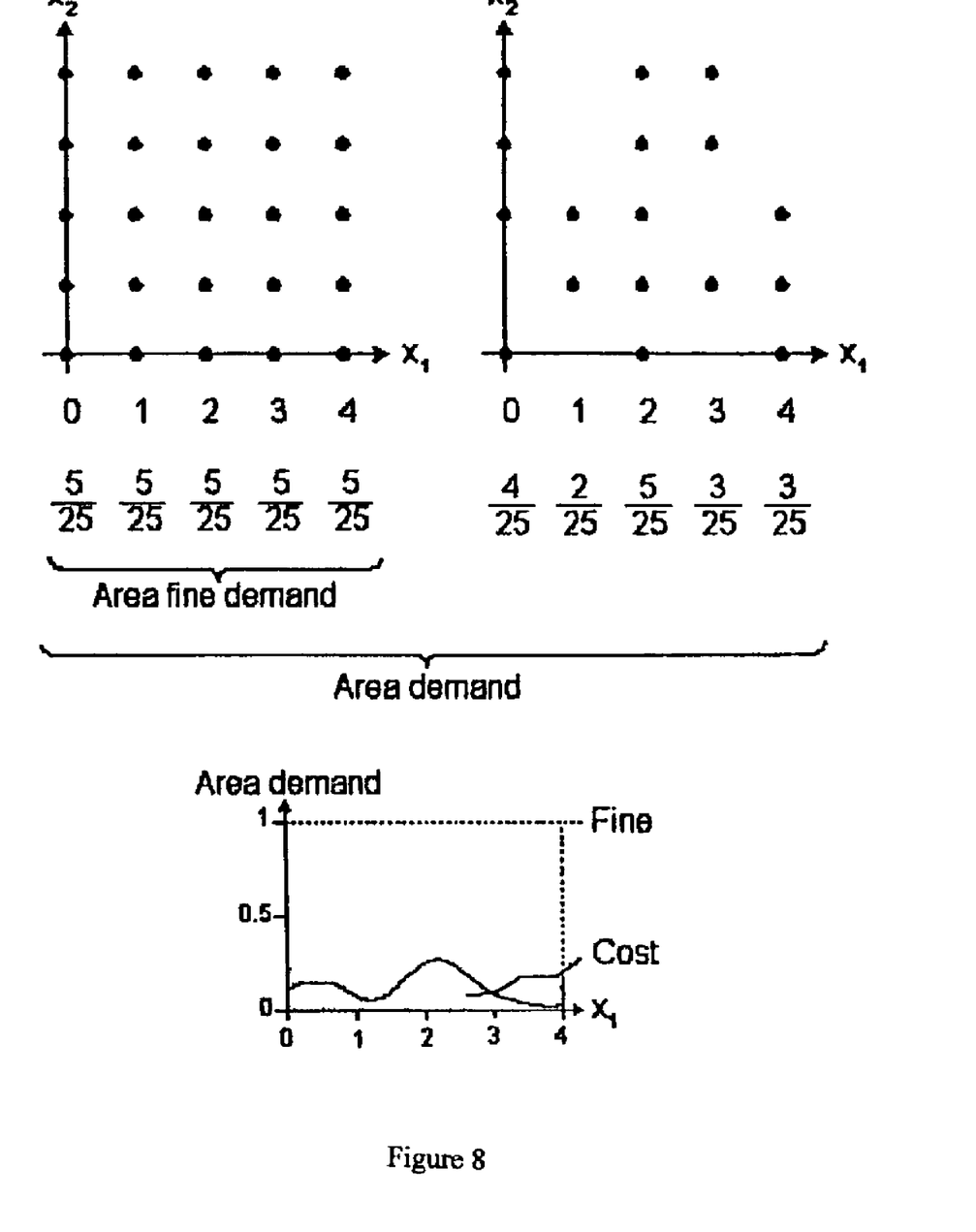
FIG. 8 shows the control elements, the density function and a graph of the Demand Cost for a two dimensional system.
Figure 9:
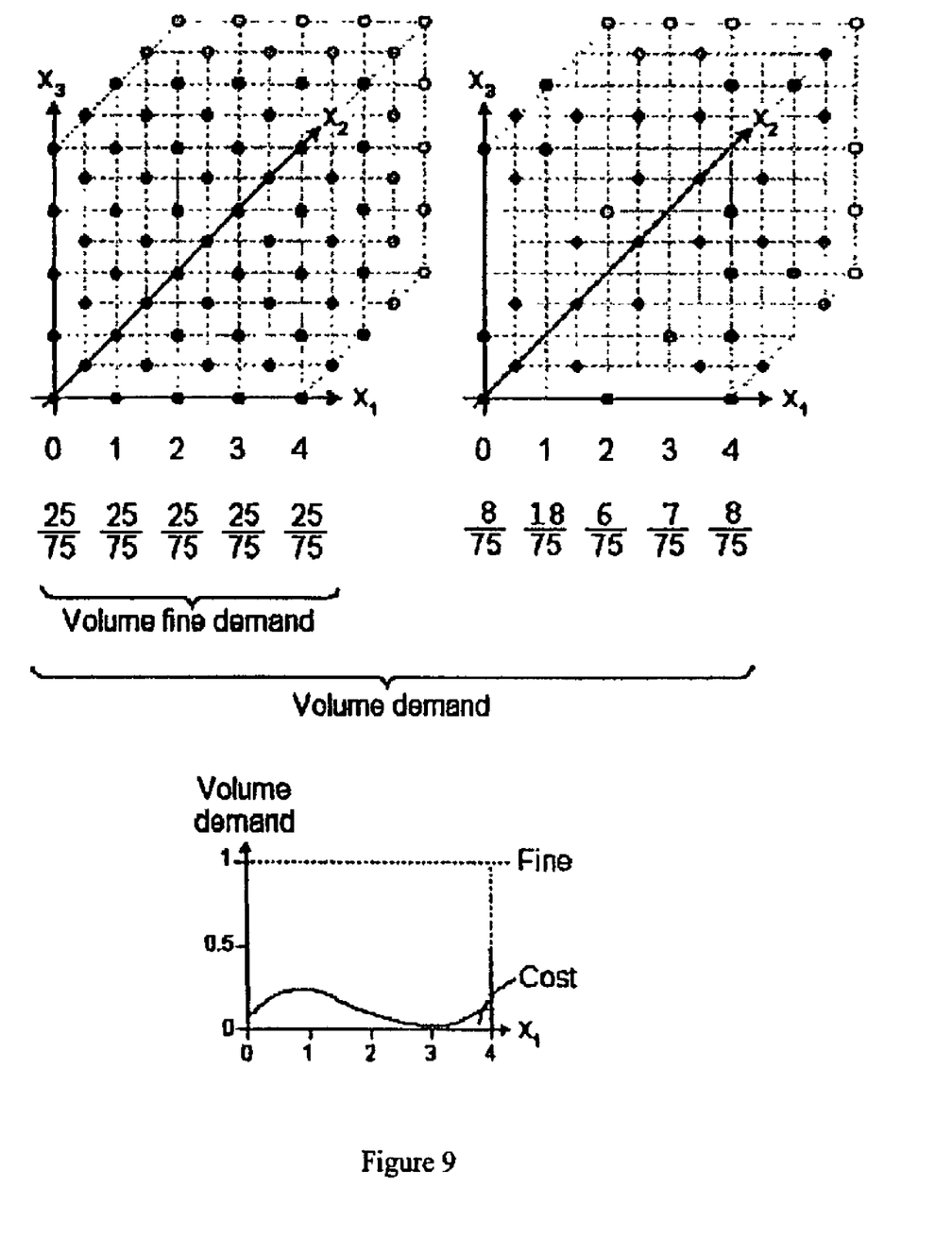
FIG. 9 shows the control elements, the density function and a graph of the Demand Cost for a three dimensional system.

The data at any of these points is a simple number, a vector, a matrix, or any sort of data structure suitable to represent the discretized model. (Note, this invention is not concerned with what the actual value of the discretization, only with its storage requirement.) Graph 60 of FIG. 6 illustrates this idea, where the system is shown with a uniform grid, and the discretization is a scalar field, so that the data/point is a scalar such as a floating-point number. Computers generally offer several types of data storage to suit the nature and numerical precision requirements of the application. These include character, integer, floating-point, and double precision. Each has an associated amount of memory storage. Graph 61 of FIG. 6 is the same system, but illustrating a "vector field." The vector field will have a greater data density than the scalar field. Thus the factor data/point is independent of the size of the system. The factor point/space, on the other hand, depends on the size of the system. Note that while FIG. 5 shows a uniform data density, it need not be, in which case the spacing of the points would vary accordingly. FIGS. 7, 8, and 9 illustrate some cases where the data density is non-uniform.

Helpful in understanding this invention is the description of the demand function. The demand function is that fraction of node points actually used in a given subdivision over the maximum number of node points possible if a fine grid is used uniformally throughout the space. That is demand(space)=refine(space)/fine(space)

where refine is the non-uniform grid that is based on the space rate of change of data, and fine is the uniform grid based on the discretization described above. Thus $0 \leq$ demand $\leq$ fine $\leq 1$ since when refine=fine then refine/fine=1. Because of the non-uniformity of refine with respect to space, the demand function will vary as shown in the graphs at the bottom of FIGS. 7, 8, and 9. Next, it helps define a unit-less ratio σ, where σ=space/Period S so that $0 \leq \sigma \leq 1$.

So demand(σ)=refine(σ)/fine.

Also helpful to understanding this invention is a unit-less metric called DemandCost, where $0 \leq$ DemandCost $\leq 1$ DemandCost is used in the invention to rank a problem in terms of its data density. DemandCost is directly proportional to demand, and a problem's space-rate of change is directly proportional to computational density. That is d/dσDemandCost α Density(σ)

which is integrated to evaluate the demand cost of a sub-domain over a space-period S. Thus $$DemandCost(\sigma) = \int_{s_0}^{s} \text{Density}(\sigma) d\sigma.$$

Figure 11:
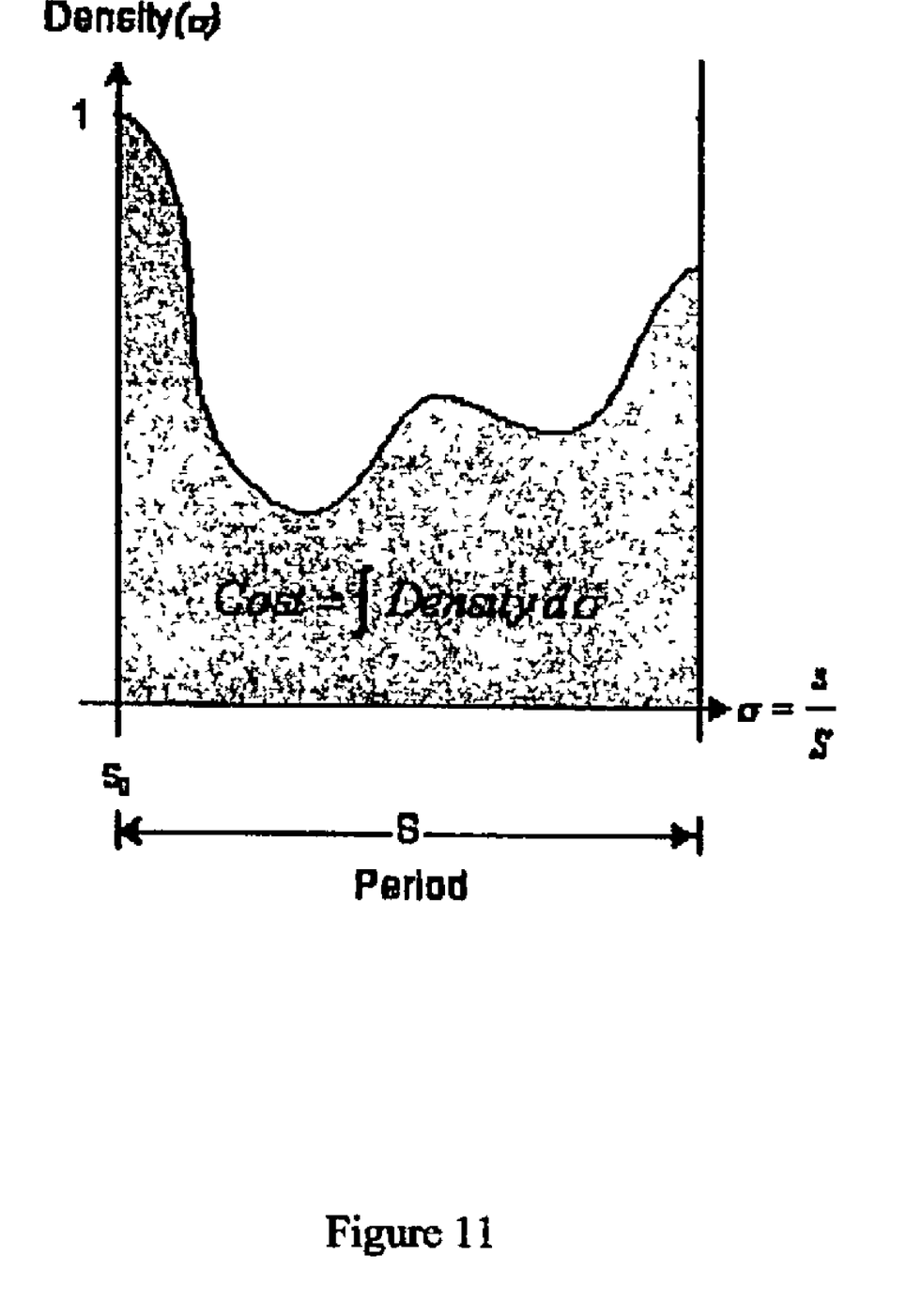
FIG. 11 shows a graph of the density function and Demand Cost for a sub-domain.

The density function and demand cost for a sub-domain is illustrated in FIG. 11.

In order to satisfy the discretized demand, supply properties are examined and hosts are ranked in terms described below and as described in Method and Apparatus to Manage Multi-Computer Supply, Ser. No. 09/943,8249 (Publication No. U.S. 2003/0078955A1), filed Aug. 31, 2001. The assignment of hosts to satisfy sub-domain demand is a mapping of highest sub-domain demand to highest hosts, while ensuring that the resources of the host selected can accommodate the sub-domain demand. In theory, this is the equilibrium point of the supply-demand model described by the preferred embodiment of this invention. The equilibrium point is the point at which the supply cost curve and the demand cost curve intersect, thus satisfying demand in an optimal manner.

Supply is defined as an "ordered-set" of scalars representing a ratio of the following properties of a computer:

Capacity=<CPU, memory, temporary disk space, cache> and

Utilization=<CPU(t), memory(t), temporary disk space(t), cache(t)>

Capacity is the physical configuration of a computer and is considered to be constant over long periods of time. It represents the availability of these properties. Utilization is variable and represents the use of these properties that vary with time. The properties have the corresponding dimensions and units as summarized in the following table. All units are greater than zero.

| property | dimension | unit |
|---|---|---|
| CPU | CPU | CPU |
| memory | data | bytes |
| temporary file | data | bytes |
| page space | data | bytes |

Supply(σ) is defined to be the normalized and, so, unit-less difference of Capacity and Utilization(σ)

Supply(σ)=(Capacity−Utilization(σ))/Capacity.

The SupplyCost function is defined as $$SupplyCost(\sigma) = 1 - \int_{s_0}^{s} Supply(\sigma) d\sigma.$$

SupplyCost ranks a computer in terms of its properties over time where Supply↑⇒↓ Cost (an increase in Supply implies a decrease in SupplyCost).

The following describes how these functions are utilized in the method and apparatus of this invention.

Referring to FIG. 3 the scientific or engineering model are input into PARCE 30 and the computational domains are iniatialized. The discretized model, which has been transformed into a regular grid, resides on computer disk storage as a file, and so requires its loading into memory. The format of this file is a fixed-length record, where each record describes a node, its coordinates, and the "value" of the discretization at that node, along with its neighbor nodes and their coordinates. This format makes the distribution of the file simple in a multi-processor implementation of the present invention. The number of multi-processors would be "User" defined, labeled $p_0, p_1 \ldots p_{n-1}$. Each processor reads an equal fraction of the total number of records in the file, where the number of file fractions equals the number of processors used.

The initial computational domain is divided into a number of equal sized geographic sub-domains with respect to the space coordinates of the model. This is illustrated in FIG. 10, which, as an example, uses twelve processors labeled 0, 1, ... 11. This division is based on the number of processors selected by the user, and done by means of the bisectors, which are mathematical separations between groups of nodes. FIG. 10 shows that the computational domain has two horizontal bisectors and two vertical bisectors. Each of the grid points, indicated as dots 100, is a control element.

As each processor simultaneously reads its fraction of the file. If the node is "owned"—as defined by the sub-domain—by the processor that reads that node, then the node-name and its coordinates are loaded into a data structure that represents that sub-domain. A count of the total nodes loaded into that sub-domain is maintained as the points/space term that is needed to compute data density. If the node read is owned by another processor, then this information is communicated using MPI to the processor that owns it. This process continues until each processor completes reading its fraction of the file.

Each sub-domain is itself divided into an integer fraction of rows and/or columns. Data density varies non-uniformity across each sub-domain because the overall domain has more data in some places than in others. For the case of linear data demand, the demand equation is of the form demand(linear)=(vector[i]/total number of grid points (nodes)),0≦i ≦n−1 where vector[i] is a vector that records the use of a grid point for a data point and i is the sub-domain number.

The data density for each control element is then calculated in PARCE 30. FIG. 7 is an example of the use of this equation for the case of five grid points. On the top left-hand side of the figure is a one-space, labeled $x_1$, with five nodes numbered 0 through 4. Note that FIG. 7 is an example of the one-space data density shown in FIG. 5, and that a data-point occupies each "node" location on the axis. Since each of the five nodes is occupied by a data point, there are five fractions to evaluate.

⅕, ⅕, ⅕, ⅕, ⅕

Note that the sum of the fine, or uniform, linear demand equals one. On the top right-hand side of FIG. 7 is an example of the refined form of linear data density. Note that nodes 2 and 4 do not have a data point, so the corresponding values apply:

⅕, ⅕, 0, ⅕, 0

These demand values are represented as a continuous graph at the bottom of the FIG. 7. Note that the curve dips to zero at the points on the curve that correspond to zero values on the refined linear space model. The DemandCost of this example is the area under the demand curve. Note that the cost of a fine demand is one since the area under its curve is one.

For the case of area data demand, the demand equation is of the form demand(area)=Σpoints[j][k]/total number of grid points(nodes)),0 ≦i ≦n−1 where Σpoints[j][k] is a matrix that records the use of a grid point for a data point. FIG. 8 illustrates area demand, where now two axis are used: $x_1$ and $x_2$. As before, the fine, or uniform, area data density has all nodes occupied with data points.

5/25, 5/25, 5/25, 5/25, 5/25

Note that the sum of area fine demand equals one. At the top right-hand side of FIG. 8 is the refine area density where some grid points are unoccupied by data points. The corresponding refine data demand is

4/25, 2/25, 5/25, 3/25, 3/25

The value of each refined factor is the sum of the data points in the column of nodes above it. The bottom of the figure shows the density function and its cost.

Finally, FIG. 9 shows a volume data density. As before, the top left-hand side is the fine, or uniform, data density

25/125, 25/125, 25/125, 25/125, 25/125

Note that the sum of the volume fine demand equals one. Again at the top right-hand side of FIG. 9 is the refined volume data density with its corresponding values, where the value of each refined factor is the sum of the data points in the corresponding plane of nodes. Thus linear, area, and volume data demand functions represent the data density within sub-domain.

After calculating the data density PARCE 30 is used to calculate the demand cost for each sub-doamain. The cost of each sub-domain is the area under the density curve. This is illustrated in FIG. 11. This area may be calculated by a numerical integration method such as the trapezoid rule or Simpson's rule. See, for example, P. A. Calter, M. A. Calter, Technical Mathematics, 4th ed., John Wiley and Sons, International Standard Book Number (ISBN) 0-471-36887-3, 2000, pg. 1068. Because of variations in data density, the cost also will vary across the model. Next, an average cost for all sub-domains is determined, which maybe a distributed reduce operation.

PARCE 30 is then used to minimize the difference in the average demand cost. The object of minimizing the difference in average demand cost step is to adjust the "size" of the sub-domain to minimize the difference in the average cost of the sub-domains. The result is approximately equal data density among all sub-domains.

Sub-domain size can be adjusted by "moving" the bisectors. The vertical bisectors are free to "move" left and right, and the horizontal bisectors are free to move up and down. FIG. 10 illustrates this process. FIG. 10 shows a horizontal computational domain 102 where the horizontal bisectors remain as continuous lines and the vertical bisectors break-up in order to form smaller sub-domains that have a cost closer to the average cost. Likewise, FIG. 10 shows a vertical computational domain 103 where the vertical bisectors remain as continuous lines and the horizontal bisectors break-up in order to form smaller sub-domains that have a cost closer to the average cost.

The process of minimizing the difference in the average cost is a minimization problem, and solved by optimization methods. This is done by adjusting the size of the sub-domains, without changing the number of sub-domains, such that the change in the average sub-domain data density is minimized. A constraint on this process is that in one approach, the horizontal transformation, the number of horizontal bisectors remains constant, although these bisectors can move up and down, and the vertical bisectors can be fragmented within their row. Alternately, in a second approach, the vertical transformation, the number of vertical bisectors remains constant, where these bisectors can move right and left, and the horizontal bisectors can be fragmented within their column. Data density is recomputed based on the grid in each changed sub-domain.

The hosts are then ranked by value. Once the demand cost has been optimized, the corresponding data density table (DDT) 31 in FIG. 3 is transported to the Economy utility 33 as a file, which is "written" by one of the multiprocessors after having collected the data density from each of the multi-processors.

The Economy utility 33 uses the data density table (DDT) to assign specific processors to each of the sub-domains by mapping the supply ranking to the demand ranking. Economy 33 returns this assignment in the form of the data ownership table (DOT) 31 as a file. This is shown in FIG. 3. The "ownership" assignment is used by each of the processors to generate the appropriate sub-domain file or frame.

The generating of data frames occurs in PARCE 30. Each of the processors simultaneously writes its frame file. The frame file 37 is that part of the original input file (domain), comprising the sub-domain selected by the optimization method proposed in this invention. These frames are used by the processors selected by the Economy utility to run parallel applications as shown in FIG. 3.

Thus the demand of a physical problem is quantified in term of memory (31). It is the demand that is matched against the quantified supply of computer resources in demand 340 to enable a parallel solution of the problem using the data ownership table 32 and the sub-domain frames 37.

Note that in the preferred embodiment of this invention the methodology itself is a "parallel program" which is embodied in media. In addition to the hardware/software environment described in FIG. 3 above, such a method may be implemented, for example, by operating a computer, as embodied by a digital data processing apparatus, to execute a sequence of machine-readable instructions. These instructions may reside in various types of signal-bearing media. Returning briefly to FIG. 3 showing a simplified data-flow of the Economy program and its relation to the PARCE program, the software module Economy is itself a parallel program operating under the IBM Parallel Operating Environment (POE) or the Argonne National Laboratory MPICH. Also shown are three files, Servers 34, Hosts 38, and Pool 36. The Servers file 34 lists all the processors available within a computer network, including computers, workstations, printers, fax machines, etc., including the "address" of each server. The Servers file is processed to produce the Hosts file 38. This is done by one or more computers testing the servers by means of a series of Operating System commands, as is well known in the art (see, for example, IBM Publication SC23-4115-00 IBM AIX Command Language Reference, IBM Corporation, 1997).

Figure 12:
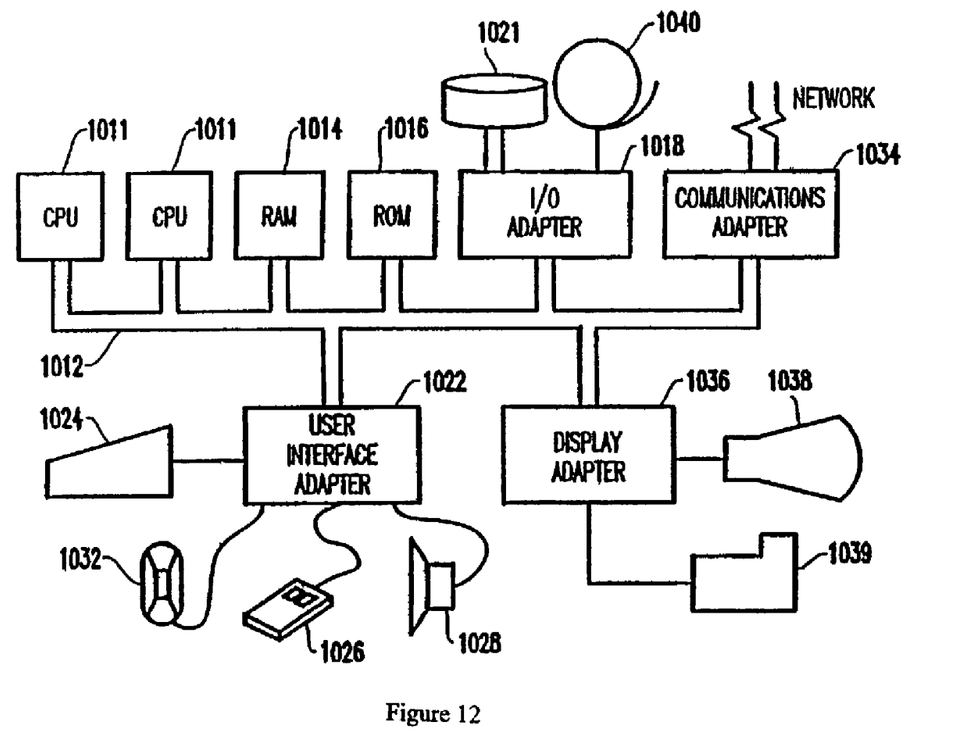
FIG. 12 illustrates a typical computer which could be used to practice this invention.

FIG. 12 illustrates a typical hardware configuration of an information handling/computer system in accordance with the invention and which preferably has at least one processor or central processing unit (CPU) 1011.

The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039 (e.g., a digital printer or the like). Thus, this aspect of the present invention is directed to a programmed product, comprising signal-bearing media tangibly embodying a program of machine-readable instructions executable by a digital data processor incorporating the CPU 1011 and hardware above, to perform the method of the invention.

Figure 13:
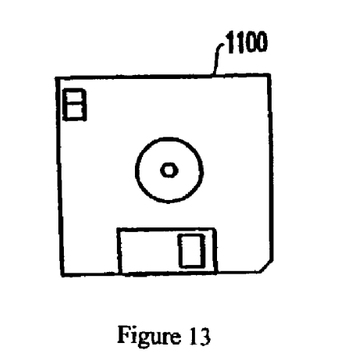
FIG. 13 illustrates software media, a form of which can be used to store the methodology to practice this invention.

This signal-bearing media may include, for example, a RAM contained within the CPU 1011, as represented by the fast-access storage for example. Alternatively, the instructions may be contained in another signal-bearing media, such as a magnetic data storage diskette 1100 FIG. 13, directly or indirectly accessible by the CPU 1011.

Whether contained in the diskette 1100 (the diskette is representative of media only and not necessarily preferred), the computer/CPU 1011, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of a single preferred embodiment, those skilled in the art will recognize that the invention can be practiced with modification within the spirit and scope of the appended claims.

What is claimed is:

1. A method to determine the memory requirements of an application running in parallel on the system, comprising the steps of:
  inputting a model and initializing a computational domain;
  calculating a data density for each control element;
  calculating demand cost for each sub-domain;
  minimizing the difference in average demand cost;
  ranking the processors by value; and
  generating a data ownership table and frame file.

2. The method of claim 1, wherein the model is a discretized system model of a physical system.

3. The method of claim 1, wherein initializing a computational domain also comprises dividing the domain into a number of equal sized geographic sub-domains with respect to the space coordinates of the model.

4. The method of claim 3, wherein initializing a computational domain also comprises dividing the sub-domains into an integer fraction of rows and/or columns.

5. The method of claim 1 wherein data density within the sub-domains is represented by linear, area, and volume data demand functions.

6. The method of claim 1 wherein the demand cost is an area under a data density curve and is calculated by a numerical integration method.

7. The method of claim 1 wherein minimizing the difference in average demand cost also comprises adjusting the sub-domain size by "moving" bisectors.

8. The method of claim 7 wherein minimizing the difference in average demand cost also comprises recomputing data density based on a grid in each size adjusted sub-domain.

9. A system of networked computers having a plurality of processors and an operating system for executing a target parallel application process using at least a subset of said plurality of processors, wherein said system includes a method to determine the memory requirements of an application running in parallel on the system, said method comprising:
inputting a model and initializing a computational domain;
calculating a data density for each control element;
calculating demand cost for each sub-domain;
minimizing the difference in average demand cost;
ranking the processors by value; and
generating a data ownership table and frame file.

10. The method of claim 9, wherein the model is a discretized system model of a physical system.

11. The method of claim 9, wherein initializing a computational domain also comprises dividing the domain into a number of equal sized geographic sub-domains with respect to the space coordinates of the model.

12. The method of claim 11, wherein initializing a computational domain also comprises dividing the sub-domains into an integer fraction of rows and/or columns.

13. The method of claim 9 wherein data density within the sub-domains is represented by linear, area, and volume data demand functions.

14. The method of claim 9 wherein the demand cost is an area under a data density curve and is calculated by a numerical integration method.

15. The method of claim 9 wherein minimizing the difference in average demand cost also comprises adjusting the sub-domain size by "moving" bisectors.

16. The method of claim 15 wherein minimizing the difference in average demand cost also comprises recomputing data density based on a grid in each size adjusted sub-domain.

17. A signal-bearing medium tangibly embodying a program of machine-readable instructions executable by a digital processing apparatus to determine the memory requirements of an application running in parallel on the system, said machine-readable instructions comprising:
inputting a model and initializing a computational domain;
calculating a data density for each control element;
calculating demand cost for each sub-domain;
minimizing the difference in average demand cost;
ranking the processors by value; and
generating a data ownership table and frame file.

18. The method of claim 17, wherein the model is a discretized system model of a physical system.

19. The method of claim 17, wherein initializing a computational domain also comprises dividing the domain into a number of equal sized geographic sub-domains with respect to the space coordinates of the model.

20. The method of claim 19, wherein initializing a computational domain also comprises dividing the sub-domains into an integer fraction of rows and/or columns.

21. The method of claim 17 wherein data density within the sub-domains is represented by linear, area, and volume data demand functions.

22. The method of claim 17 wherein the demand cost is an area under a data density curve and is calculated by a numerical integration method.

23. The method of claim 17 wherein minimizing the difference in average demand cost also comprises adjusting the sub-domain size by "moving" bisectors.

24. The method of claim 17 wherein minimizing the difference in average demand cost also comprises recomputing data density based on a grid in each size adjusted sub-domain.

* * * * *